United States Patent [19]

Tsuneta et al.

[11] Patent Number: 5,105,318
[45] Date of Patent: Apr. 14, 1992

[54] HEAD POSITIONING DEVICE FOR USE IN MAGNETIC DISK EQUIPMENT

[75] Inventors: Katsuhiro Tsuneta; Toshiyuki Haruna; Yuji Yoshida; Akira Kojima, all of Odawara, Japan

[73] Assignee: Hitachi, Ltd., Tokyo, Japan

[21] Appl. No.: 243,595

[22] Filed: Sep. 12, 1988

[30] Foreign Application Priority Data

Sep. 14, 1987 [JP] Japan .................. 62-230295

[51] Int. Cl.$^5$ .................. G11B 5/58; G11B 5/596
[52] U.S. Cl. .................. 360/77.01; 360/77.04; 360/78.04
[58] Field of Search .................. 360/77.01–77.11, 360/77.12–77.17, 78.01, 78.02, 78.04–78.15

[56] References Cited

U.S. PATENT DOCUMENTS

| 4,135,217 | 1/1979 | Jacques et al. | 360/77.04 |
| 4,536,809 | 8/1985 | Sidman | 360/77.04 |
| 4,594,622 | 6/1986 | Wallis | 360/77.04 |
| 4,616,276 | 10/1986 | Workman | 360/77.04 |
| 4,814,909 | 3/1989 | Brown et al. | 360/78.07 |
| 4,969,059 | 11/1990 | Volz et al. | 360/78.04 |

FOREIGN PATENT DOCUMENTS 58-29180  2/1983  Japan .
59-146485 8/1984  Japan .
59-146486 8/1984  Japan .

OTHER PUBLICATIONS

IBM TDB vol. 19 No. 6, "Self-Calibrating Disk Storage Apparatus", Griffiths et al., 11/76, pp. 1991–1992.

Primary Examiner—Aristotelis Psitos
Assistant Examiner—Steven R. Garland
Attorney, Agent, or Firm—Kenyon & Kenyon

[57] ABSTRACT

A head positioning device for use in a magnetic disk equipment includes a position detector for detecting the deviation of a magnetic head from the center line of a desired track on a magnetic disk, a comparator for generating a polarity signal indicative of the direction of the deviation of the magnetic head from the center line of the desired track, on the basis of the output of the position detector, and a microcomputer for calculating a correction value necessary for the precise positioning of the magnetic head on the center line of the desired track. An optimum correction value is determined for each of a plurality of tracks on the basis of measurement, immediately after the power supply of the magnetic disk equipment has been turned on, and an actuator mounted with the magnetic head is driven on the basis of the correction values thus obtained, to position the magnetic head very accurately.

19 Claims, 2 Drawing Sheets

HEAD POSITIONING DEVICE FOR USE IN MAGNETIC DISK EQUIPMENT

BACKGROUND OF THE INVENTION

The present invention relates to a head positioning device for use in a magnetic disk equipment, and more particularly to a head positioning device which includes an inexpensive circuit for compensating for an effect of an external force on the positioning of a magnetic head, to improve the positioning accuracy of the magnetic head and to shorten an access time to a desired track.

In a general magnetic disk equipment, a magnetic head is lifted with a increase in the rotational speed of a magnetic disk. Similarly, the head is lowered with a decrease in rotational speed. In this case, in order to protect the data recording area of the magnetic disk, it is necessary to place the magnetic head outside of the data recording area when the rotation of the magnetic disk is started or stopped. Hence, an actuator mounted with the magnetic head is usually pulled in a predetermined direction by a retracting spring so that the magnetic head or heads of the device are located at the innermost of the magnetic disks or disks when the actuator is not operated. Thus, an external force is applied to the actuator by the retracting spring. Furthermore, the mechanical resistance of a flexible printed circuit (FPC) for exchanging signals with the moving part of the actuator and the wind pressure due to the rotation of the magnetic disk act as additional external forces applied to the actuator. These external forces will reduce the positioning accuracy of the magnetic heads.

In recent years, in order to increase the capacity and operating speed of a magnetic disk equipment, the track width of a magnetic disk and the weight of an actuator have been greatly reduced. As a result, the effect of the external forces applied to the actuator has became too large to be neglected. Accordingly, it is usual for a magnetic disk equipment to provide compensation for the effect on the positioning of the magnetic heads by external forces applied to the actuator.

A method of compensating for the effects of the external forces has hitherto been known, in which the external forces applied to an actuator are compensated for by using a constant correction value, independently of which of tracks on a magnetic disk confronts a magnetic head. In a case where the actuator is pulled by a retracting spring in a direction from the center of the magnetic disk toward an outer track, however, an external force which is applied to the actuator at a time the magnetic head is placed on an inner track, is stronger than an external force applied at a time the magnetic head is placed on an outer track, and hence the above constant correction value method cannot make full compensation for the external forces across the entire surface of the disk.

Another method has been proposed, in which an appropriate correction value for each of tracks between an innermost track and an outermost track is selected from a predetermined correction table. In this method using the correction table, however, it is impossible to compensate for a change in gravity applied to an actuator due to variations in the structure of a magnetic disk equipment, or caused by whether the magnetic heads are arranged in a horizontal direction or in a vertical direction.

A further method of solving the above problem has been proposed, in which the measured value of an external force is obtained with the aid of an A-D converter, and the correction value is updated on the basis of the measured value, as described in, for example, a Japanese patent application JP-A-58-29180. In more detail, the measured value of an external force is obtained in such a manner that a current for driving an actuator is detected, and the detected current value is converted by the A-D converter into a digital value. In this method, a relatively expensive A-D converter is required. In addition also the measured value is affected by an offset voltage generated in a phase compensation circuit or other circuits. Thus, it is not always possible to obtain an accurate correction value.

Still another method has been proposed, in which an analog feedback loop is formed so that an external-disturbance cancelling signal is applied to a power amplifier, as described in Japanese patent applications JP-A-59-146486 and JP-A-59-146485. In the above method of compensating for external forces by the real time processing using an analog circuit the external forces are composed of low-frequency components approximate to a D.C. component. As a result it takes a lot of time to feed a change in external force back to the power amplifier after the change has been detected. That is, the above method is disadvantageous in its response characteristics.

In a system for controlling the positioning of a magnetic head, a feedback loop is usually formed on the basis of a position signal, and moreover phase compensation is carried out to improve the stability of the feedback loop and to reduce a steady-state deviation. However, when a low-frequency gain is made too large, follow-up characteristics are improved but it takes a lot of time for the position signal to reach a predetermined level after the magnetic head has been moved. Hence, it is undesirable to make the low-frequency gain greater than a predetermined value. Accordingly, when an external force is applied to an actuator, the level of a head-position signal will be changed by an amount corresponding to the steady-state deviation.

SUMMARY OF THE INVENTION

The present invention overcomes the disadvantages of the above correction circuits providing a head positioning device for use in a magnetic disk equipment which device can place a magnetic head accurately at a desired position without being affected by the loaded state of a magnetic disk or variations in circuit board and magnetic disk which device can be formed of inexpensive circuit means.

A head positioning device according to the present invention is formed by adding a comparator to a conventional device and uses an additional program, to automatically compensate for an external force. The comparator is used for detecting the deviation of the level of a position signal from a reference value, and the output of the comparator is a digital signal for indicating the polarity of the position signal. The output indicative of the polarity of the position signal is monitored for a period corresponding to one revolution of the magnetic disk by a control circuit (that is, compensation-value calculating means) such as a microcomputer, to detect the direction of the positional deviation of the magnetic disk from a cylinder. The microprocessor updates the correction value for compensating an external force so that the number of positive outputs which are delivered from the comparator in a period corresponding to one revolution of the magnetic disk becomes equal to the number of negative outputs delivered in the above period. The correction value for compensating the external force is updated a plurality of times, and a change in correction value is halved each time the correction value is updated, to make a difference between the final correction value and a right correction value less than one bit.

The measurement of an external force is carried out at a plurality of positions on a magnetic disk, preferably at about 20 positions between the innermost track and the outermost track. The approximated correction value at each track is determined on the basis of the measured values of external force.

According to an aspect of the present invention, there is provided a head-positioning control system used in a magnetic disk equipment and including a servo head for reading out servo information recorded on a magnetic disk. A position detector is provided for generating a signal indicative of the deviation of the servo head from the center line of a track on the magnetic disk. A phase compensator compensates for a phase shift of the output of the position detector and forms a negative feedback loop together with the position detector. A drive circuit for drives an actuator mounted with the servo head so that the positional deviation of the servo head is reduced. A controller controls the actuator driving circuit. In the system a comparator for detecting only the direction of the deviation of the servo head from the center line of a track is connected to the output side of the position detector, to form a control loop of the position detector, the comparator, the controller and the actuator driving circuit. Each time the magnetic disk starts a normal operation after a power supplied has been turned on the controller detects external forces at a plurality of positions between the innermost and outermost tracks on the magnetic disk from the output of the comparator and calculates correction values for compensating for the detected external forces. The correction values are stored in the controller, to be used for compensating for the influence of the external force on the subsequent operation of the servo head.

In the present invention, a phenomenon that the servo head is slightly deviated from an ordinary position by an external force applied to the actuator, that is, a steady-state deviation due to the external force, is utilized to determine the polarity of a head position signal by the comparator. Further, it is judged on the basis of the polarity of the head position signal whether a correction value for compensating for the external force is greater than or less than a correct value, and the correction value is updated till the correction value becomes substantially equal to the correct value. That is, the positioning of the servo head is controlled in the above manner.

DETAILED DESCRIPTION

Figure 1:
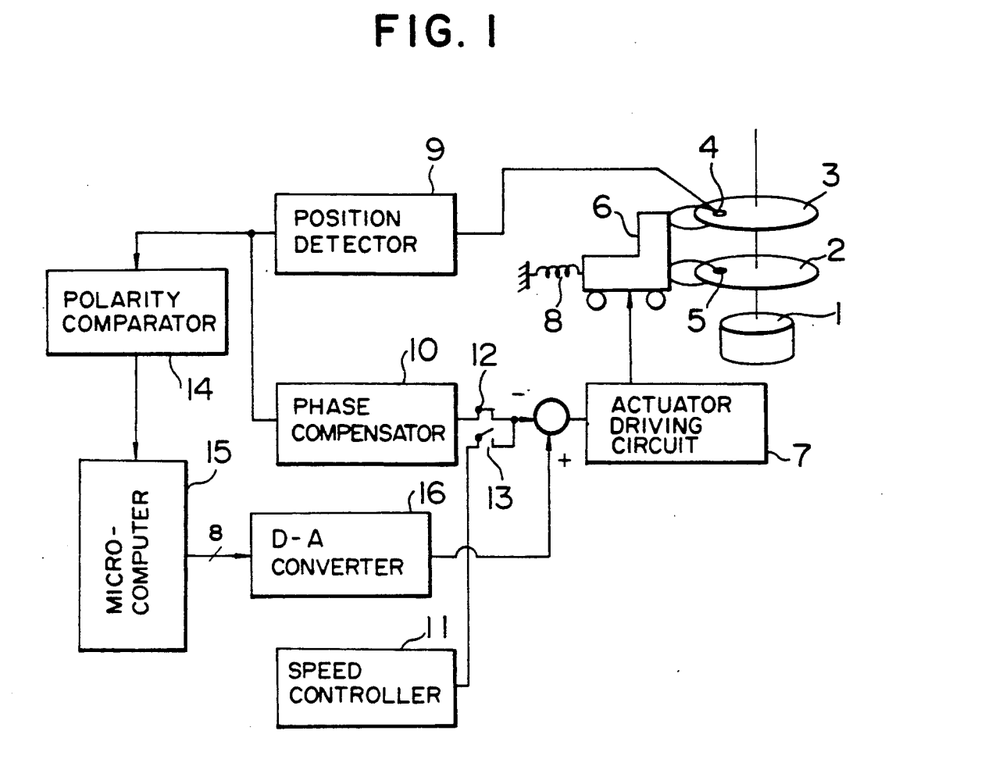
FIG. 1 is a block diagram showing an embodiment of a head-positioning control system for use in a magnetic disk equipment according to an embodiment the present invention.

FIG. 1 is a block diagram showing an embodiment of a head-positioning control system for use in a magnetic disk equipment according to the present invention.

Referring to FIG. 1, a recording/reproducing disk (namely, disk for recording and reproducing information) 2 and a servo recording disk 3 are both mounted on a driving spindle 1, and a servo head 4 is disposed on the recording surface of the servo recording disk 3. The servo head 4 is fixed to an actuator 6, together with a data head 5 disposed on the recording/reproducing disk 2, and thus the heads 4 and 5 can move on desired tracks simultaneously. The actuator 6 is driven by a current generated by an actuator driving circuit 7. That is, in a voice coil type positioner, a current generated by the actuator driving circuit 7 flows through the coil of a voice coil type linear motor, and thus each of the data head 5 and the servo head 4 makes a linear motion in proportion to the above current.

Further, the actuator 6 is affected by an external force due to a retracting spring 8 and others. A position detector 9 delivers a position signal in accordance with servo information read out by the servo head, and the position signal takes a zero level when the servo head 4 is placed on the center line of a track. When the actuator 6 is pulled by the external force, a positive or negative value indicative of the deviation of the servo head from the center line of a track is delivered from the position detector 9. A phase compensator 10 is used for making the above deviation equal to zero. In more detail, the phase compensator 10 compensates for the phase shift (namely, lag or lead) of the position signal, cuts off the highfrequency component thereof, and forms a tracking loop together with the position detector 9 and the actuator driving circuit 7 so that the output of the phase compensator 10 is applied, as a negative feedback signal, to the actuator driving circuit 7. A speed controller 11 is used for controlling the movement of the servo head between tracks. One of the phase compensator 10 and the speed controller 11 is connected to the actuator driving circuit 7 in accordance with the states of switches 12 and 13. In more detail, in a period when each of the heads 4 and 5 is moved across a plurality of tracks to reach a desired track, the switch 12 is made open and the switch 13 is closed to control the actuator driving circuit 7 with the output of the speed controller 11. When each of the heads 4 and 5 comes near the desired track, the switch 13 is made open and the switch 12 is closed, to control the actuator driving circuit 7 by the tracking loop including the position detector 9 and the phase compensator 10.

A polarity comparator 14 is used for detecting the deviation of the level of the position signal from a reference level, and the output of the polarity comparator 14 is a digital signal. The digital signal from the polarity comparator 14 is applied to a microcomputer 15. The microcomputer 15 monitors the output of the polarity comparator 14 for a period corresponding to one revolution of the disks 2 and 3, to detect positive and negative tracking errors in the above period. Further, the microcomputer 15 delivers correction data for compensating for the tracking errors to a D-A converter 16. The correction data is applied to the D-A converter 16 in such a manner that eight bits are delivered in parallel. An analog output from the D-A converter 16 is applied to a circuit element provided on the input side of the actuator driving circuit 7, to supply the actuator 6 with a current for compensating for the external force.

Next, the operation of this embodiment of the present invention will be explained below.

Figure 3:
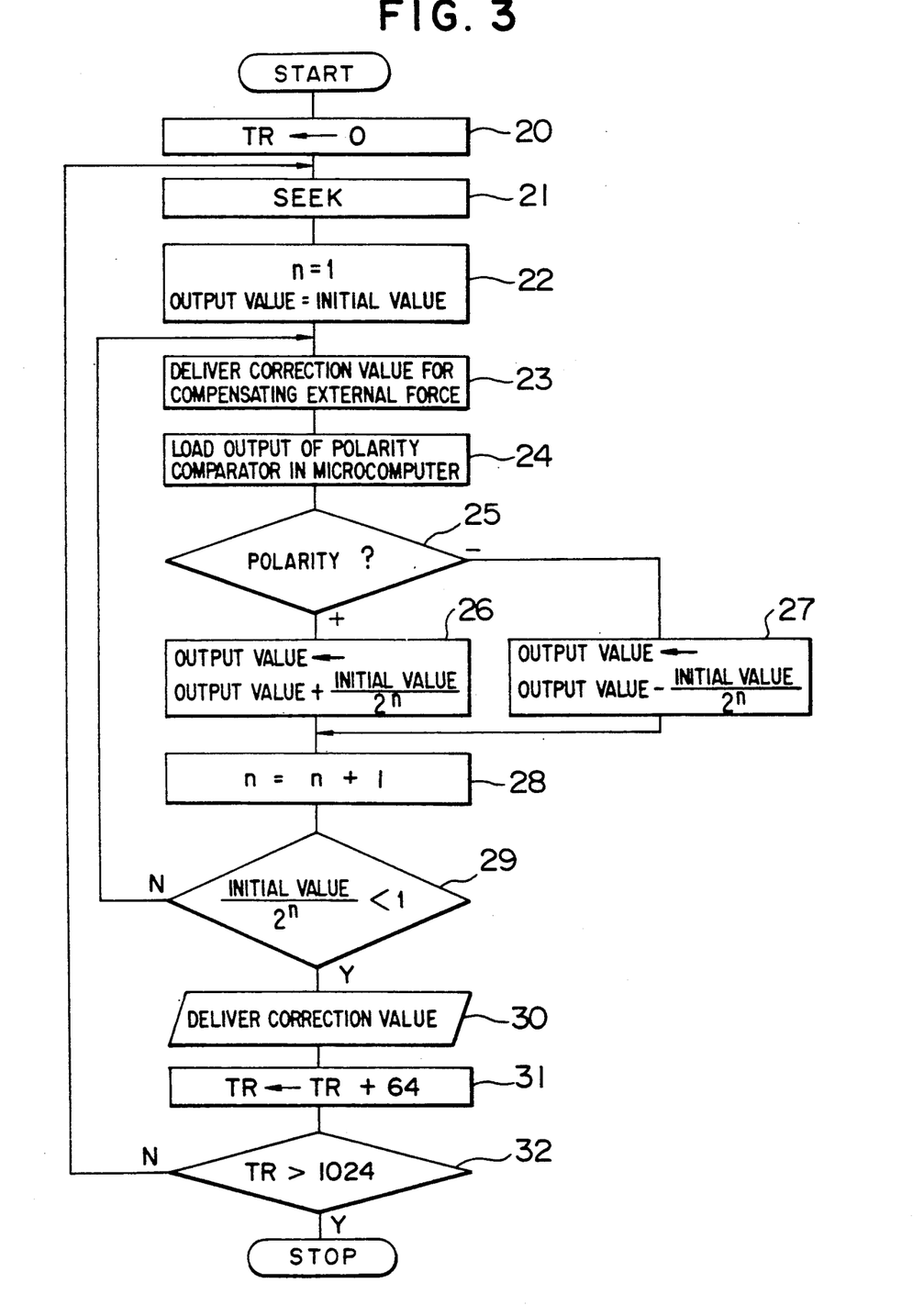
FIG. 3 is a flow chart showing steps of procedure for determining a correction value which is used for compensating for an external force, using the microcomputer of FIG. 1.

In the present embodiment, the measurement of the external force is made as a part of the initial sequence at a time a power supply is turned on, and an appropriate correction value for the external force is determined as shown in the flow chart of FIG. 3.

Referring to FIG. 3, when the magnetic disk apparatus is put in a normal operation state after a power supply has been turned on, a target track number is set to zero, that is, the number of the outermost track (step 20). The heads 4 and 5 are placed on outermost tracks (step 21). Then, a counted value n is set to one (1), and the output of the micro 15 is set to an initial value which is a standard correction value (step 22). Now, let us suppose that the initial value is 128. The correction value from the microcomputer 15 is applied to the D-A converter 16 (step 23). In this state, the output of the polarity comparator 14 for detecting the direction of the deviation of the level of the position signal from a reference level is loaded in the microcomputer 15 (step 24). The microcomputer 15 judges the polarity of the position signal in such a manner that the output level of the comparator 14 is detected at intervals of 20 microseconds over a period of time corresponding to one revolution of the disks 2 and 3 (namely, a period of about 16.6 milliseconds), and a counted value indicating how many times a high output level is detected, is compared with a counted value indicating how many times a low output level is detected. The output level of the comparator 14 is detected for the period corresponding to one revolution of the disks. To eliminate the effect of the vibration of a spindle motor, the eccentric rotation of the disks and other high-frequency vibrational components on the judgement of the polarity of position signal, the In a case where the standard correction value is smaller than an actual or correct correction value, the polarity of the position signal becomes positive. While, in a case where the standard correction value is greater than the actual correction value, the polarity of the position signal becomes negative.

In step 25, the polarity of the position signal is checked. When it is judged that the polarity of the position signal is positive, a value obtained by dividing the initial standard correction value by $2^n$ is added to the output value (step 26). When the polarity of the position signal is judged to be negative, the value obtained by dividing the initial value by $2^n$ is subtracted from the output value (step 27). In the above case, the initial value is 128 and the counted value n is one (1). Hence, a numerical value 64 is added to or subtracted from the output value to create a new standard correction value.

Next, the counted value n is incremented by one step 28), and the processing in the steps 23 to 28 is repeated until a value obtained by dividing the initial value by $2^n$ becomes less than one (1).

As is evident from the above, a change in modified correction value is halved each time the polarity of the position signal is measured. In the present embodiment, the correction value is updated seven times to obtain an appropriate correction value. The correction value thus obtained and the track number are sent to an RAM (not shown), to be stored therein (step 30). Then, a numerical value 64 is added to the track number (step 31), and the processing in the steps 21 to 31 is repeated till the track number becomes equal to 1,024, that is, the innermost track is specified. Thus, a correction value is determined for each of 17 tracks. A correction value for each of a multiplicity of tracks on the servo disk can be determined from the correction values for 17 tracks by one of various interpolation methods. In the present embodiment, the linear interpolation method is used for determining a correction value for a track which exists between measured tracks.

Figure 2:
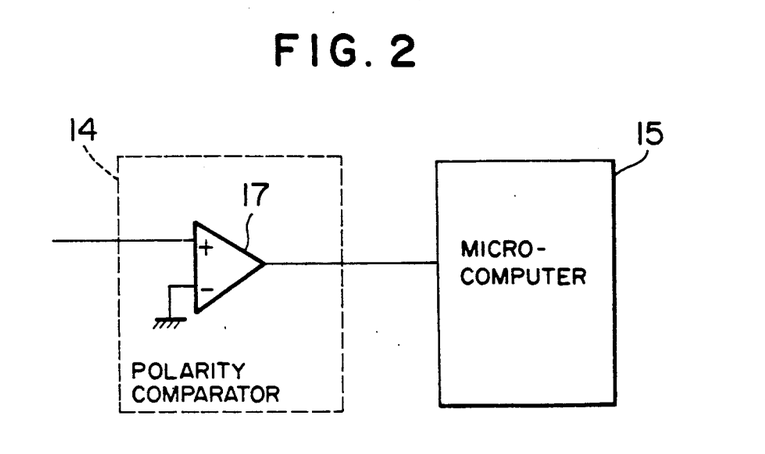
FIG. 2 is a diagram showing the polarity comparator 14 of FIG. 1 in detail.

FIG. 2 is a diagram showing the polarity comparator 14 of FIG. 1 in detail. As shown in FIG. 2, the polarity comparator 14 can be formed of a voltage comparator 17. That is, the positive and negative input terminals of the comparator 17 are applied with the output of the position detector 9 and a ground potential, respectively, to compare the position signal from the position detector 9 with the zero level indicative of the ground potential. Thus, in a case where the correction value is smaller than an actual correction value, the comparator 17 sends a positive output to the microcomputer 15. While, in a case where the correction value is greater than the actual correction value, the comparator 17 sends a negative output to the microcomputer 15.

As mentioned above, according to the present embodiment, an external force applied to the actuator is measured as a part of the initial sequence at a time a power supply is turned on, and a correction value is determined on the results of the measurement. Accordingly, the external force can be appropriately compensated for independently of variations in structure of magnetic disk equipment and whether a magnetic disk is arranged in a horizontal direction or in a vertical direction. That is, the results of measurement at a plurality of positions, for example, an external force of 10 g at the thousandth track, an external force of 100 g at the hundredth track, and others are recorded in a table in the microcomputer 15. Accordingly, appropriate compensation can be carried out for a magnetic disk equipment used and for a desired track on a disk. Thus, the positioning accuracy is improved and the access time to a desired track can be shortened.

Further, the present embodiment can be obtained only by adding one comparator to a conventional head-position control system, in which correction data for compensating an external force is previously stored in a microcomputer, and the stored data is converted by a D-A converter into analog data, to be used for compensating the external force. Accordingly, the present embodiment is advantageous from the standpoint of manufacturing cost.

In the present embodiment, an external force applied to the actuator has been measured at 17 tracks. However, it is to be determined in accordance with a desired positioning accuracy and a total measuring time required how-many times the external force is measured.

In the present embodiment, the measurement of external force is made as a part of an initial sequence at a time a power supply is turned on. The measurement of external force may be further made when a predetermined time has elapsed after the power supply was turned on, to update a correction value. In this case, a change in external force due to the generation of heat can be appropriately compensated.

Further, in the present embodiment, it is possible to reduce the low-frequency gain of the phase compensator 10 temporarily and intentionally for the purpose of increasing a steady-state deviation value. Thus, a tracking error can be detected very accurately.

What is claimed is:

1. A head positioning device for use with a magnetic recording medium comprising:
   a magnetic head for reading out servo information recorded on a magnetic recording medium;
   an actuator mounted with the magnetic head; means for controlling the movement of the actuator so that the magnetic head is placed on a desired track on the magnetic recording medium;
   means for generating an output signal indicative of a deviation of the magnetic head from a center line of the desired track;
   means for compensating for a phase shift of said output signal, said means for compensating forming a negative feedback loop together with the means for controlling and the means for generating an output signal to reduce the positional deviation of the magnetic head;
   a comparator comparing the level of said output signal with a predetermined level, and generating a polarity signal indicative of the direction of deviation of the magnetic head from the center line of the desired track; and
   a processor calculating a correction value for placing the magnetic head on the center lien of the desired track, on the basis of the polarity signal from said comparator, said correction value being supplied to the negative feedback loop.

2. A head positioning device according to claim 1, wherein said means for controlling the movement of the actuator includes,
   means for controlling the moving speed of the actuator, and
   a driving circuit generating a driving current which is used for driving the actuator.

3. A head positioning device according to claim 1, wherein said output signal attains a zero level when the magnetic head is placed on the center line of the desired track.

4. A head positioning device according to claim 1, wherein means for compensating compensates a lead and a lag of said output signal, and cuts off a highfrequency component of said output signal.

5. A head positioning device according to claim 1, wherein said predetermined level of said comparator mean is a zero level.

6. A head positioning device according to claim 1, wherein said processor calculates a correction value capable of making the level of the output signal substantially equal to a zero level.

7. A head positioning device according to claim 6, wherein said processor calculates a correction value for each of a plurality of tracks on the magnetic disk.

8. A head positioning device according to claim 1, wherein said processor calculates the correction value when the power supply of a magnetic disk equipment is turned on and prior to normal usage.

9. A method of positioning a magnetic head in a magnetic disk equipment, comprising the steps of:
   placing a magnetic head on a desired track on a magnetic disk;
   reading out servo information recorded on the magnetic disk;
   detecting a signal indicative of the deviation of the magnetic head from the center line of the desired track;
   compensating a phase shift of the detected signal and forming a negative feedback loop using the phase shift compensation for controlling the movement of an actuator mounted with the magnetic head;
   comparing the level of the detected signal with a predetermined level, and generating a polarity signal indicative of the direction of the deviation of the magnetic head from the center lien of the desired track;
   calculating a correction value for placing the magnetic head on the center line of the desired track, on the basis of the polarity signal; and
   supplying the calculated correction value to the negative feedback loop to control the movement of the actuator.

10. A method according to claim 9, wherein the correction value for placing the magnetic head on the center line of the desired track is calculated when the power supply of a magnetic disk equipment is turned on and prior to normal usage.

11. A method according to claim 9, wherein the correction value for placing the magnetic head on the centerline of the desired track is calculated for each of a plurality of tracks on the magnetic plurality of tracks disk which includes an outer track, an intermediate track and an inner track.

12. A head positioning device for use in a magnetic disk equipment, comprising:
   a magnetic head for reading out servo information recorded on a magnetic disk;
   an actuator mounted with the magnetic head;
   an actuator driving circuit controlling the movement of the actuator so that the magnetic head is placed on a desired track on the magnetic disk;
   a position detector, responsive to servo information read from the disk by the magnetic head, generating an output signal indicative of a deviation of the magnetic head from a center line of the desired track;
   a phase compensator compensating for a phase shift of said output signal, said phase compensator forming a negative feedback loop together with the actuator driving circuit and the position detector to reduce the positional deviation of the magnetic head with respect to a track on the magnetic disk;
   a comparator comparing the level of said output signal with a predetermined level, and generating a polarity signal indicative of the direction of deviation of the magnetic head from the center line of the desired track; and
   a microcomputer calculating a correction value for placing the magnetic head on the center line of the desired track using said polarity signal from said comparator, said correction value being supplied to the negative feed back loop.

13. The head positioning device of claim 12 wherein said actuator driving circuit includes:
   means for controlling the moving speed of the actuator; and
   a driving circuit generating a driving current used for driving the actuator;
   wherein said phase compensator compensates a lead and a lag of said output signal, and cuts off a high frequency component of said output signal.

14. The head positioning device of claim 13 wherein said output signal attains a zero level when the magnetic head is placed on the center line of the desired track and wherein said microcomputer calculates a correction value capable of making the level of said output signal substantially equal to zero.

15. The head positioning device of claim 12 wherein said output signal attains a zero level when the magnetic head is placed on the center line of the desired track and wherein said microcomputer calculates a correction value capable of making the level of said output signal substantially equal to zero.

16. A head positioning device of ruse in a magnetic disk equipment, comprising:
   a magnetic head for reading out servo information recorded on a magnetic disk;
   an actuator mounted with the magnetic head;
   an actuator driving circuit controlling the movement of the actuator so that the magnetic head is placed on a desired track on the magnetic disk;
   a position detector, responsive to servo information read from the disk by the magnetic head, generating an output signal indicative of a deviation of the magnetic head from a center line of the desired track;
   a phase compensator compensating for a phase shift of said output signal, said phase compensator forming a negative feedback loop together with the actuator driving circuit and the position detector to reduce the positional deviation of the magnetic head with respect to a track on the magnetic disk;
   a comparator comparing the level of said output signal with a predetermined level, and generating a polarity signal indicative of the direction of deviation of the magnetic head from the center line of the desired track; and
   a microcomputer calculating a correction value for placing the magnetic head on the center line of the desired track using said polarity signal from said comparator, said correction value being supplied to the negative feed back loop.

17. The head position device of claim 16 wherein the magnetic disk includes n tracks where n is an integer greater than and wherein said microcomputer calculates a correction value for m of said n tracks where m is an integer greater than 1 but less than n and the microcomputer interpolates a correction value for each of the remaining n−m tracks from the correction values calculated for said m tracks.

18. A method of positioning a magnetic head in a magnetic disk equipment, comprising the steps of:
   placing a magnetic head on a desired track on a magnetic disk;
   reading out servo information recorded on the magnetic disk;
   detecting a signal indicative of the deviation of the magnetic head from the center line of the desired track using the servo information read out by the magnetic head;
   compensating a phase shift of the detected signal and forming a negative feedback loop using the phase shift compensation for controlling the movement of an actuator mounted with the magnetic head;
   comparing the level of the detected signal with a predetermined level and generating a polarity signal indicative of the direction of the deviation of the magnetic head from the center line of the desired track;
   calculating a correction value for placing the magnetic head on the center line of the desired track, on the basis of the polarity signal; and
   supplying the calculated correction value to the negative feedback look to control the movement of the actuator.

19. A method of generating correction values associated with a plurality of tracks of a magnetic recording medium comprising the steps of:
   a. positioning a magnetic head over a selected one of a plurality of tracks on the magnetic recording medium;
   b. setting a variable n to an initial value of one;
   c. setting an output of a microcomputer x to an initial value corresponding to a standard correction value;
   d. detecting a signal indicative of the deviation of the magnetic head from the center line of the desired track;
   e. comparing the level of the detected signal with a predetermined level and generating a polarity signal indicative of the direction of the deviation of the magnetic head from the center line of the desired track;
   f. detecting a polarity of the polarity signal indicative of the direction of the deviation a predetermined number of times over a period of one revolution of the magnetic recording medium and counting the number of times a high output level is detected compared to the number of times a low level output is detected when monitoring the polarity of the position signal during the revolution of the magnetic recording medium;
   g. generating a new output value by adjusting the previous output value in accordance with polarity of the position signal and a value determined by the standard correction value divided by 2n;
   h. incrementing n by 1; and
   i. determining if the quotient of the standard correction value divided by $2'$ is less than 1, and if it is not repreating steps d to i, if it is then delivering the correction value to a storage table, associating the correction value with the track over which the magnetic head is disposed.

* * * * *

UNITED STATES PATENT AND TRADEMARK OFFICE
CERTIFICATE OF CORRECTION

PATENT NO. : 5,105,318
DATED : April 14, 1992
INVENTOR(S) : Katsuhiro TSUNETA, et al.

It is certified that error appears in the above-identified patent and that said Letters Patent is hereby corrected as shown below:

Column 1, line 13, change "In a general magnetic disk equipment," to --Generally, in magnetic disk equipment,--.

Column 1, line 14, change "a increase" to --an increase--.

Column 1, line 24, between "innermost" and "of" insert --area--.

Column 1, line 37, change "became" to --become--.

Column 1, line 38, change "neglected" to --ignored--.

Column 1, line 46, between "of" and "tracks" insert --the--.

Column 2, line 45, between "circuits" and "providing" insert --by--.

Column 2, lne 46, after "equipment" insert a comma.

Column 3, line 25, delete "for".

Column 3, line 35, change "supplied" to --supply--.

Column 3, line 61, between "embodiment" and "the" insert --of--.

UNITED STATES PATENT AND TRADEMARK OFFICE
CERTIFICATE OF CORRECTION

PATENT NO. : 5,105,318
DATED : April 14, 1992
INVENTOR(S) : Katsuhiro TSUNETA, et al.

It is certified that error appears in the above-identified patent and that said Letters Patent is hereby corrected as shown below:

Column 4, line 35, change "high frequency" to --high-frequency--.

Column 5, line 16, change "micro 15" to --micro-computer 15--.

Column 5, line 34, change "disks. To" to --disks to--.

Column 5, line 38, after "signal" change the comma to a period and delete "the".

Column 6, line 30, after "for" insert a comma.

Column 6, line 55, change "how-many_ to --how many--.

Column 7, lines 6 and 7, move "means" from line 6 to line 7 to start new paragraph and change "the" to --said--.

Column 7, line 25, change "lien" to --line--.

Column 7, line 42, change "highfre-" to --high-fre---.

Column 7, line 53, change "the" to --a--.

UNITED STATES PATENT AND TRADEMARK OFFICE
CERTIFICATE OF CORRECTION

PATENT NO. : 5,105,318

DATED : April 14, 1992

INVENTOR(S) : Katsuhiro TSUNETA, et al.

It is certified that error appears in the above-identified patent and that said Letters Patent is hereby corrected as shown below:

Column 8, line 6, change "lien" to --line--.

Column 8, lines 22 and 23, move "disk which includes" from line 23 to line 22 after the word "magnetic" and on line 22, delete the second occurrence of "plurality of tracks".

Column 8, line 53, change "feed back" to --feedback--.

Column 8, line 63, change "13" to --12--.

Column 9, line 1, change "12" to --13--.

Column 9, line 7, change "of ruse" to --for use--.

Column 9, line 36, change "feed back" to --feedback--.

Column 9, line 39, between "than" and "and" insert --m--.

UNITED STATES PATENT AND TRADEMARK OFFICE
CERTIFICATE OF CORRECTION

PATENT NO.  : 5,105,318
DATED       : April 14, 1992
INVENTOR(S) : Katsuhiro TSUNETA, et al.

It is certified that error appears in the above-identified patent and that said Letters Patent is hereby corrected as shown below:

Column 10, line 14, change "look" to --loop--.

Column 10, line 49, change "2'" to --(2n)--.

Signed and Sealed this

Fourteenth Day of September, 1993

Attest:

BRUCE LEHMAN

*Attesting Officer*            *Commissioner of Patents and Trademarks*